(12) United States Patent
Thompson et al.

(10) Patent No.: US 6,678,449 B2
(45) Date of Patent: Jan. 13, 2004

(54) VISIBLY DISTINGUISHABLE COLORED OPTICAL FIBER RIBBONS

(75) Inventors: Justin Thompson, Mooresville, NC (US); Bob Stulpin, High River (CA); Jamie Smith, Claremont, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/901,065

(22) Filed: Jul. 10, 2001

(65) Prior Publication Data

US 2003/0016924 A1 Jan. 23, 2003

(51) Int. Cl.[7] .............................. G02B 6/44; G02B 6/04
(52) U.S. Cl. .................. 385/114; 385/115; 385/128
(58) Field of Search .................. 385/100–115, 123, 385/126–128

(56) References Cited

U.S. PATENT DOCUMENTS

| | | | |
|---|---|---|---|
| 4,900,126 A | 2/1990 | Jackson et al. | |
| 5,076,881 A | 12/1991 | Ferguson | |
| 5,119,464 A | 6/1992 | Freychet et al. | |
| 5,881,194 A | 3/1999 | Duecker | |
| 5,908,873 A * | 6/1999 | Shustack | 522/39 |
| 5,949,940 A | 9/1999 | Botelho et al. | |
| 5,982,967 A | 11/1999 | Mathis et al. | |
| 6,028,976 A | 2/2000 | Sato et al. | |
| 6,054,217 A | 4/2000 | Szum et al. | |
| 6,085,010 A * | 7/2000 | Zahora et al. | 385/114 |
| 6,097,866 A | 8/2000 | Yang et al. | |
| 6,122,428 A | 9/2000 | Duecker | |
| 6,130,980 A | 10/2000 | Murphy et al. | |
| 6,134,364 A | 10/2000 | DeFabritis et al. | |
| 6,137,936 A | 10/2000 | Fitz et al. | |
| 6,195,491 B1 * | 2/2001 | Jackson et al. | 385/114 |
| 6,301,415 B1 * | 10/2001 | Zahora et al. | 385/114 |
| 6,319,549 B1 * | 11/2001 | Szum et al. | 385/114 |
| 6,321,014 B1 * | 11/2001 | Overton et al. | 385/114 |
| 6,339,666 B2 * | 1/2002 | Szum et al. | 385/128 |
| 6,455,607 B1 * | 9/2002 | Shustack | 522/42 |

* cited by examiner

*Primary Examiner*—Brian Healy
*Assistant Examiner*—Kevin S Wood
(74) *Attorney, Agent, or Firm*—Sughrue Mion, PLLC

(57) ABSTRACT

A visibly distinguishable colored optical fiber ribbon is provided having optical fibers with a colored secondary coating and an ink coating applied to the secondary coating. The optical fiber ribbons are also provided with a plurality of optical fibers therein, wherein each optical fiber has a uniquely colored secondary coating covered by an ink coating having a same color over a majority of the colored optical fibers. Since the optical fibers are distinguishable by color coding, the ribbon coatings do not require print identifiers thereon. As a result, the ribbons are easily identified in the dark enclosures where fiber optic cables are typically deployed.

17 Claims, 3 Drawing Sheets

VISIBLY DISTINGUISHABLE COLORED OPTICAL FIBER RIBBONS

BACKGROUND OF THE INVENTION

1. Field of the Invention

The present invention relates to optical fiber ribbons for optical fiber telecommunication cables and a process of making the optical fiber ribbons. More particularly, the present invention relates to optical fiber ribbons that are color coded to visibly distinguish ribbons and to enable easy identification of the fiber #1 position.

2. Description of the Related Art

Optical fiber cable manufacturers frequently employ optical fiber ribbons, or multi-ribbons, in optical fiber cables to provide an organized structure that increases packing efficiency, facilitates rapid splicing, and simplifies fiber connections. Ribbon assemblies also provide a modular design that simplifies the construction, installation, and maintenance of optical glass fibers by eliminating the need to handle individual optical glass fibers.

Optical fiber ribbons generally include a plurality of optical fibers arranged in a planar array. Each optical fiber generally includes a core, a cladding, and primary and secondary coatings formed from an ultraviolet (UV) light curable material. The optical fibers are usually coated with an outer color layer applied to the secondary coating, i.e., an ink coating to distinguish the fibers from one another. In the alternative, a colorant may be added to the secondary coating to distinguish the fibers from one another.

Ink coatings facilitate identification of a particular optical fiber within a ribbon and allow one or more of the optical fibers to be selected for purposes of splicing, or the like. An ink coating typically increases the diameter of each optical fiber by 5–10 µm, resulting in a 25–50 µm wider ribbon (12-fiber ribbons) and a 10–20 µm thicker ribbon.

Currently, the industry standard calls for using a clear ribbon matrix material to bind all the ink coated optical fibers therein. Each clear ribbon coating has an identifier printed thereon for distinguishing individual ribbons from the plurality of ribbons in a given fiber optic cable. However, the clear ribbons having print identifiers thereon are difficult to read in dark enclosures where fiber optic cables are typically deployed.

U.S. Pat. No. 6,122,428 discloses a ribbon assembly containing a plurality of coated optical fibers that are bound together by a matrix material. Each of the optical fibers has an ink coating for identifying the individual fibers. Additionally, in order to keep the ink coating on the individual fibers, the level of adhesion between the ink coating and the matrix material is adjusted to be less than the level of adhesion between the ink coating and the secondary coating of the optical fiber.

FIG. 1 illustrates an example of a conventional optical fiber ribbon 10 having a clear ribbon matrix coating 20 covering twelve optical fibers that are arranged in a parallel planar array. Each of the optical fibers 30 is coated with a primary coating (not shown) and a secondary coating 32. A color ink layer 34 overcoats the secondary coating 32 thereby adding 5–10 microns onto the optical fiber diameter. As a result, the fibers and the coating layers result in a overall diameter of approximately 250 microns.

The colored ribbon coating also suffers from the problem that unless the coating opaqueness is minimized to show the colors of the underlying optical fibers, then the colored ribbon coating still requires some level of printing thereon to identify the fiber #1 position.

SUMMARY OF THE INVENTION

It is an object of the present invention to provide a method of producing visibly distinguishable colored optical fiber ribbons and optical fibers.

It is a further object of the present invention to provide a peelable optical fiber ribbon that removes an ink coating from optical fibers while maintaining color distinguishable optical fibers.

These objects are accomplished, at least in part, by covering an optical fiber with a colored secondary coating and applying an ink coating onto the secondary coating. A plurality of optical fibers are arranged in a planar parallel array and enveloped with a clear ribbon matrix coating to bond the optical fibers together in the planar parallel array. In the preferred embodiment, the clear ribbon matrix coating is applied over the ink coating when the ink coating is not fully cured so as to produce a stronger bond between the ink coating and the clear ribbon coating than between the ink coating and the secondary coating.

Alternatively, this property may be achieved by chemistry formulation differences between the coatings that allow the ink coating to prefer crosslinking with the ribbon coating rather than the fiber's secondary coating. Any combination of level of cure, chemistry formulation differences, or any other method of achieving the desired adhesion relationship described are within the scope of the present invention.

An example of a ribbon produced in accordance with the present invention would be as follows: if fiber #1, which has a blue secondary coating, is further coated with black ink, and fibers #2 through #12 (for a 12 fiber ribbon) all have the appropriate colored secondary coating (see Table 1) and are further coated with white ink, then the finished ribbon will appear white with a black stripe along the side of the ribbon where the fiber #1 position is located.

The method of using the appearance of a stripe to locate a wire, pin, or fiber position is a commonly accepted industry standard in the copper wire ribbon industry and is equally applicable for optical fiber ribbons. Any color or colors may be used for either the stripe or the "bulk" color—black and white are merely used as example. An additional stripe of the same, or different color than the fiber #1 stripe may be added by varying the color of other fibers across the cross section of the ribbon. This technique can be used to place an identifier stripe or stripes on a ribbon to differentiate between two ribbons of the same base color contained in the same cable (i.e., the white ribbon and the white ribbon with stripe).

Ribbons produced in this manner require absolutely no printing because the colored ink provides all the necessary identifiers. Any ribbon may be specifically identified by the apparent color created by the ink coating applied to fibers #2 through #12, and the fiber #1 position in any selected ribbon may be easily identified by the apparent stripe created by the ink coating applied to fiber #1.

Additionally, a specific optical fiber may thus be located by, first, selecting a desired optical fiber ribbon based on the colored ink markings therein, and, second, peeling away the ribbon coating which removes the ink coating to expose the optical fibers which are uniquely identified by the color of their secondary coating.

TABLE 1

Example coloring of optical fibers in a ribbon

| Fiber # | 1 | 2 | 3 | 4 | 5 | 6 | 7 | 8 | 9 | 10 | 11 | 12 |
|---|---|---|---|---|---|---|---|---|---|---|---|---|
| Secondary Coating Color | blue | orange | green | brown | slate | white | red | black | yellow | violet | rose | Aqua |
| Ink Coating Color | black | white | white | white | white | white | white | white | white | white | white | white |

It is a further object of the present invention to provide an optical fiber ribbon including a plurality of optical fibers therein, wherein each optical fiber has a different colored secondary coating that is covered by an ink coating, and wherein the ink coating is a same color over a majority of the plurality of colored optical fibers.

Other objects and advantages of the present invention will become apparent to those skilled in the art from the following detailed description read in conjunction with the attached drawings and claims appended hereto.

BRIEF DESCRIPTION OF THE DRAWINGS

The above and other objects, features, and advantages of the present invention will be more readily understood from the following detailed description when read in conjunction with the accompanying drawings, which are not drawn to scale, and include:

FIG. 4b illustrates a top view of the second embodiment shown in FIG. 4a.

FIG. 5b illustrates a top view of the second embodiment shown in FIG. 5a.

DESCRIPTION OF THE PREFERRED EMBODIMENTS

Figure 1:
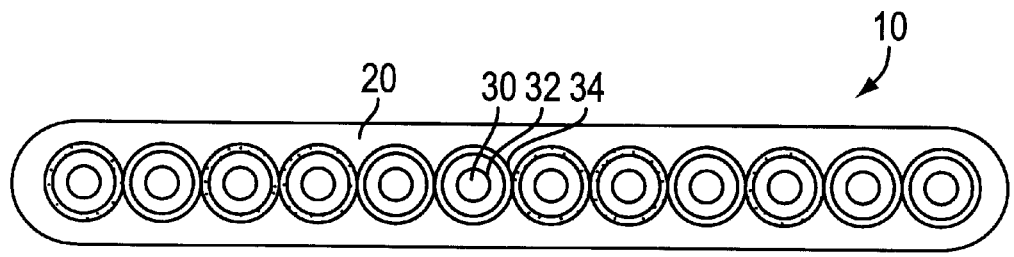
FIG. 1, illustrates a cross-sectional schematic diagram of a conventional clear optical fiber ribbon having a plurality of optical fibers arranged in a planar array, wherein each optical fiber has a clear optical core, a clear primary coating, a clear secondary coating, and an ink coating applied over the secondary coating.

In the drawings, identical reference numbers denote identical structural elements.

Figure 2:
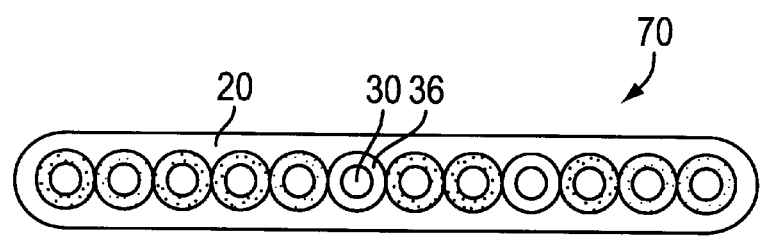
FIG. 2 illustrates a cross-sectional schematic diagram of a clear optical fiber ribbon having a plurality of optical fibers arranged in a planar array, wherein each optical fiber has a clear optical core, clear primary coating, and a secondary coating having color therein.

Referring to FIG. 2, an optical fiber ribbon 70 is illustrated having a clear ribbon matrix coating 20 covering twelve optical fibers 30 that are arranged in a parallel planar array. Each of the optical fibers 30 has colorant added to the secondary coating 36. In a preferred embodiment of the present invention, the optical fiber includes a colored secondary coating, wherein the secondary coating may be colored using ColorLock™.

Since the colorant is added into the secondary coating 36, as illustrated in FIG. 2, ribbon 70 is manufactured having smaller overall dimensions than conventional ribbons 10, as illustrated in FIG. 1. In fact, the optical fiber ribbon 70 is 25–50 microns narrower and 10–20 microns thinner than conventional optical fiber ribbons 10 having optical fibers 30 marked by adding the colored ink coating 34 over a clear secondary coating 32.

Figure 3:
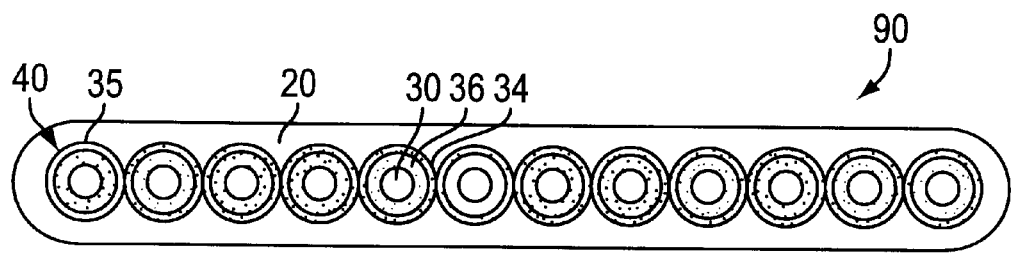
FIG. 3 illustrates a cross-sectional schematic diagram of a first embodiment of a clear optical fiber ribbon having a plurality of optical fibers arranged in a planar array, wherein each optical fiber has a clear optical core, clear primary coating, a secondary coating having color therein, and an ink coating applied over the colored secondary coating.

The reduced diameter of the optical fibers within ribbon 70 enables additional coatings to be added to the optical fibers in order to color code the ribbon 70 as is shown in ribbon 90 of FIG. 3, while maintaining overall dimensions comparable to conventional ribbons 10 of FIG. 1. As a result, ribbons 90 of FIG. 3 are easily identifiable using only color codes and do not require additional print identifiers. Furthermore, the colored secondary coating enables the purely color coded optical fibers to maintain compatibility with existing tools.

FIG. 3 illustrates an embodiment for a "blue" ribbon 90. Twelve fibers 30 are arranged in a parallel planar array, each having a different colorant added into the secondary coatings 36 to provide unique markings for each optical fiber (i.e., blue, orange, green, brown, slate, white, red, black, yellow, violet, rose, and aqua). These fibers are then each coated with the same color ink 34 (i.e., blue ink for a blue ribbon), except fiber #1 (typically the blue fiber) is marked with a different color ink 35 than the other 11 optical fibers so that it may be easily identifiable and distinguishable from the other optical fibers.

Figure 6:
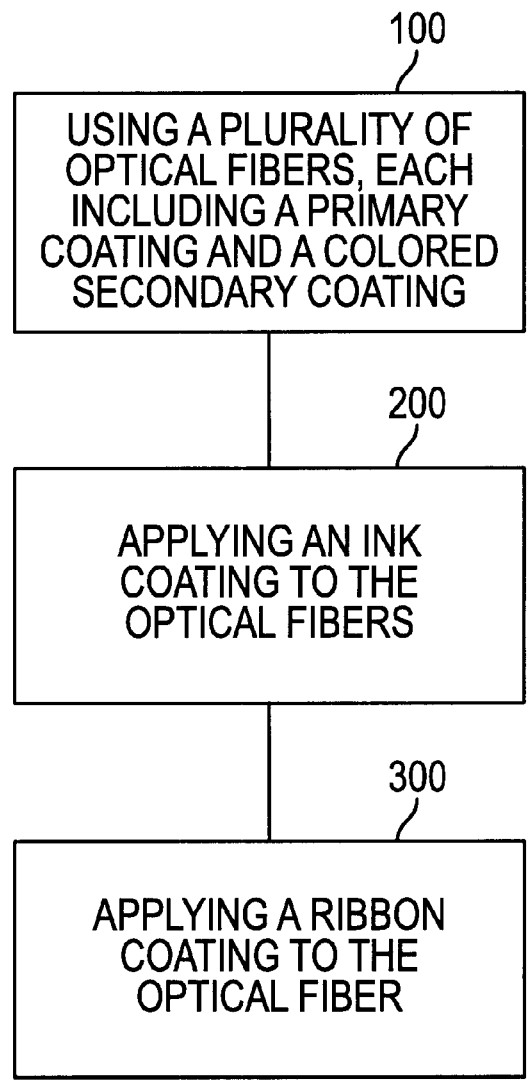
FIG. 6 illustrates a schematic diagram of a preferred method for producing visibly distinguishable colored optical fiber ribbons.

The ink requirement places an additional process step in the ribbon manufacturing process. To minimize the impact of this additional process step, an online inking system is provided that applies the ink coating in the same process that the ribbon coating is applied. Therefore, as illustrated in FIG. 6, the ribbon manufacturing process includes the steps of using a plurality of optical fibers, each including a primary coating and a colored secondary coating 100, applying an ink coating 200, and applying a ribbon coating 300.

Referring to FIG. 3, this process provides the benefit of allowing the clear ribbon matrix coating 20 to be applied while the ink coatings 34, 35 are not fully cured, so that the bond between the ink coatings 34, 35 and the ribbon coating 20 is strong, as discussed below. This quality is desirable because in order for a ribbon to be considered "peelable", the ribbon coating 20 must expose the colored fiber coating 36 when removed. Thus, in the present invention, since the secondary coating is the colored fiber coating 36, it is necessary to remove the ink coating 34 when the clear ribbon matrix coating 20 is removed.

In order to produce a "peelable" ribbon, the bond between the clear ribbon matrix coating 20 and the colored ink coating 34 must be stronger than the bond between the ink coatings 34, 35 and the optical fiber's secondary coating 36. This property ensures that, during the peeling process, the bond between the ink coatings 34, 35 and the optical fiber's secondary coating 36 breaks before the bond between the clear ribbon matrix coating 20 and the colored ink coating 34. The above feature is easy to attain because it is well known that one of the primary challenges in the art is to weaken the bond between the ink coating and the ribbon coating so that the ink coating remains attached to the optical fiber after peeling as is typically desired in prior-art ribbons made with inked fibers. See, for example, U.S. Pat. Nos. 4,900,126 and 6,130,980.

Figure 4A:
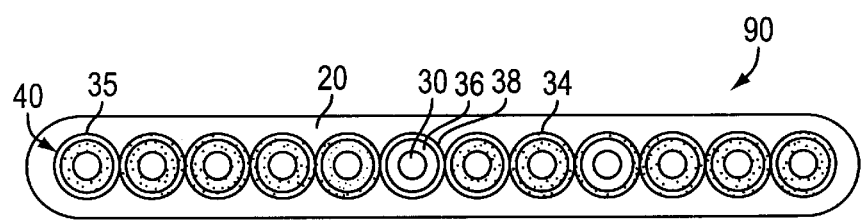
FIG. 4a illustrates a cross-sectional schematic diagram of a second embodiment of a clear optical fiber ribbon having a plurality of optical fibers arranged in a planar array, wherein each optical fiber has a clear optical core, clear primary coating, a secondary coating having color therein, and an ink coating applied over the colored secondary coating.
Figure 4B:
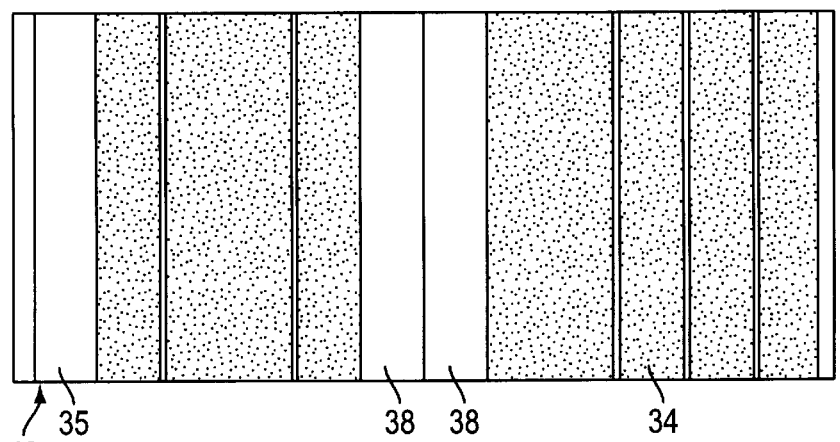

FIGS. 4a, 5a and 4b, 5b illustrate cross-sectional and top views, respectively, of further coloring schemes that may be used to distinguish ribbons. In FIGS. 4a and 4b, the fibers 30 are each coated with the same color ink 34 (i.e., blue ink for a blue ribbon), except fiber #1 (typically the blue fiber) is marked with a unique color ink 35 to highlight the fiber #1 position and fibers #6 and #7 are also marked with different colors 38 than the other optical fibers making the finished ribbon have the appearance of a stripe in the position of the #6 and #7 fibers.

The ink color used to create this "stripe" may be the same as, or different from, the color used to identify the fiber #1 location. The use of two fibers (#6 and #7) to create the appearance of a stripe produces a stripe that is bold and easily visible. Although any number of fibers may be chosen, selecting only one fiber makes it difficult to see the stripe while selecting more than two fibers may cause confusion between which color is the base and which is the stripe.

Locating the stripes at positions #6 and #7 were chosen in this example to place the stripe down the center of the ribbon, however, the stripes may be positioned at any point across the ribbon. For example, positions #11 and #12 may be selected to place the stripe along the edge. However, this may create confusion between which stripe is a ribbon identifier and which stripe marks the location of fiber #1. Centering the stripe on the ribbon minimizes this potential confusion.

Figure 5A:
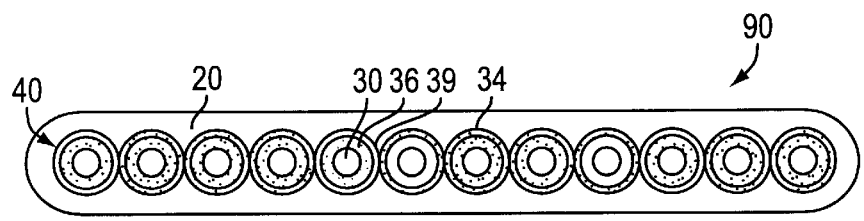
FIG. 5a illustrates a cross-sectional schematic diagram of a third embodiment of a clear optical fiber ribbon having a plurality of optical fibers arranged in a planar array, wherein each optical fiber has a clear optical core, clear primary coating, a secondary coating having color therein, and an ink coating applied over the colored secondary coating.
Figure 5B:
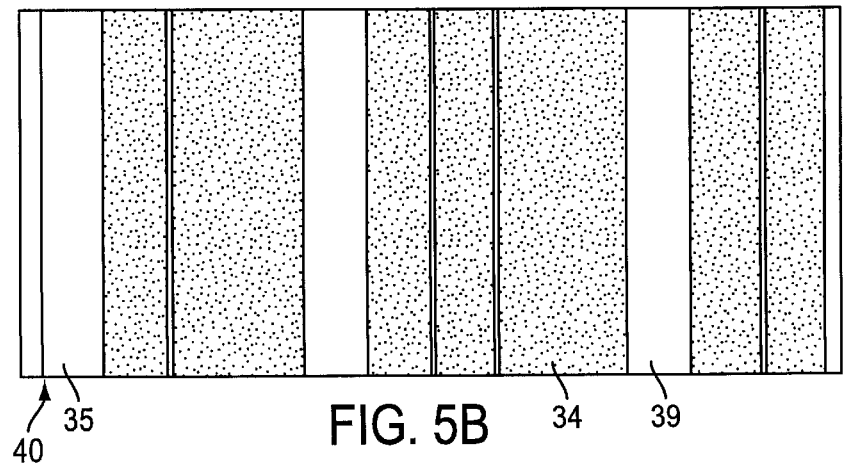

In FIGS. 5a and 5b, the fibers 30 are each coated with the same color ink 34 (i.e., blue ink for a blue ribbon), except fiber #1 (typically the blue fiber) is marked with a unique color ink 35 and fibers #5 and #10 are also marked with different colors 39 than the other optical creating the appearance of dual stripes. In this example, single fiber width stripes are used to avoid confusion between which color is the stripe and which color is the base color of the ribbon.

Ribbon coatings produced in the foregoing manner require absolutely no print identifiers because all the necessary identifiers are color-coded. As a result, the ribbons are easily identified in the dark enclosures where fiber optic cables are typically deployed. The techniques described for creating the appearance of a stripe or multiple stripes in a ribbon allow for unique identification of ribbons contained in cables that include multiple ribbons of a given color.

For instance, a 144 count fiber ribbon cable typically contains 12 ribbons—each of which is distinctly one of the twelve standard identification colors. However, a 288 count fiber ribbon cable typically contains 24 ribbons so that are two ribbons of each of the twelve basic colors. In this case, the second of each base color is uniquely identified by using a single stripe so that the cable contains one, and only one, blue ribbon and one, and only one, blue ribbon with a single stripe. Further, a 432 count fiber ribbon cable typically contains 36 ribbons so that there are three ribbons of each of the twelve basic colors.

The dual stripe technique may be used to identify the third ribbon of a given base color, such as a cable containing a blue ribbon, a blue ribbon with one stripe, and a blue ribbon with two stripes. Alternatively, both of the striped ribbons may have only one stripe, but each must have a different color for that stripe. For instance, a cable may contain a blue ribbon, a blue ribbon with a white stripe, and a blue ribbon with an orange stripe so that there are three blue ribbons in the cable, but each is uniquely identifiable. It is also within the scope of this invention to use some combination of the described techniques.

For instance, a cable may contain a blue ribbon, a blue ribbon with a single white stripe, a blue ribbon with a double white stripe, a blue ribbon with a single orange stripe, a blue ribbon with a double orange stripe, etc. In this manner, the capacity to increase the number of ribbons in a cable, while maintaining uniquely distinct identifiers on each ribbon by varying the colors used to create the stripe(s) and/or the number of stripes on a particular ribbon, is virtually limitless.

It is understood that the above-described arrangements are simply illustrative of the invention. Those skilled in the art will readily appreciate that many modifications and changes may be applied to the invention as hereinbefore exemplified without departing from its scope defined in and by the appended claims. In the method claims, the recited steps may be performed in any order.

What is claimed is:

1. A method of producing visibly distinguishable colored optical fiber ribbons, comprising the steps of:
   (a) using a plurality of optical fibers, each including a primary coating and a colored secondary coating;
   (b) applying a colored ink coating to said colored secondary coating; and
   (c) applying a clear ribbon matrix coating to said colored ink coating.

2. A method of producing visibly distinguishable colored optical fiber ribbons, comprising the steps of:
   (a) using a plurality of optical fibers, each including a primary coating and a colored secondary coating; and
   (b) applying a colored ink coating to said colored secondary coating,
   wherein an adhesion between the coatings is controlled by:
      applying a clear ribbon matrix coating to said colored ink coating while the colored ink coating is not fully cured, producing a strong bond between the colored ink coating and the clear ribbon matrix coating, or
      varying the chemistry formulations of at least one of the secondary coatings, the ink coatings, and the ribbon coating to produce a desired adhesive bond between the ink coatings and the ribbon coating and a desired adhesive bond between the ink coatings and the secondary coatings.

3. The method according to claim 1, wherein the colored ink coating is applied in a same process as the clear ribbon matrix coating.

4. The method according to claim 1, wherein the colored ink coating is removable with the clear ribbon matrix coating.

5. The method according to claim 2, wherein an adhesive force between the clear ribbon matrix coating and the colored ink coating is stronger than an adhesive force between the colored ink coating and the secondary coating.

6. The method according to claim 1, further comprising the step of:
- arranging the plurality of ink coated optical fibers in a planar parallel array;
- wherein the clear ribbon matrix coating is applied to the plurality of ink coated optical fibers arranged in the planar parallel array.

7. The method according to claim 1, wherein step (b) includes applying a first color to one of said optical fibers corresponding to fiber number one and applying a second color to the remainder of said optical fibers.

8. The method according to claim 1, wherein step (a) includes the step of coloring said secondary coating of each of said optical fibers to have different colors from each other.

9. An optical fiber ribbon, comprising:
- a plurality of colored optical fibers including primary coatings and secondary coatings, said secondary coatings having different colors therein;
- a colored ink coating which covers each of said colored optical fibers; and
- a clear ribbon matrix coating covering said colored ink coating.

10. The optical fiber ribbon according to claim 9, wherein an adhesive force between the clear ribbon matrix coating and the colored ink coating is stronger than an adhesive force between the colored ink coating and the secondary coating.

11. The optical fiber ribbon according to claim 9, further comprising a first colored ink coating covering a first colored optical fiber selected from said plurality of colored optical fibers and a second colored ink coating covering the remaining colored optical fibers, wherein the second colored ink coating is a different color than the first colored ink coating.

12. The optical fiber ribbon according to claim 9, further comprising first and second colored ink coatings covering first and second colored optical fibers selected from said plurality of colored optical fibers, and a third colored ink coating covering the remaining colored optical fibers, wherein the first, second, and third colored ink coatings are each different colors.

13. The optical fiber ribbon according to claim 9, further comprising first and second colored ink coatings covering first and second colored optical fibers selected from said plurality of colored optical fibers, and a third striped colored ink coating covering the remaining colored optical fibers, wherein the first and second colored ink coatings are a same color, and the third colored ink coatings is a different color than the first and second colored ink coatings.

14. An optical fiber ribbon, comprising:
- a plurality of colored optical fibers including primary coatings and secondary coatings, said secondary coatings having different colors therein;
- a colored ink coating which covers each of said colored optical fibers, wherein the plurality of ink coated optical fibers are arranged in a parallel planar array; and
- a clear ribbon matrix coating covering the ink coated optical fibers arranged in a parallel planar array.

15. The optical fiber ribbon according to claim 14, wherein an adhesive force between the clear ribbon matrix coating and the colored ink coating is stronger than an adhesive force between the colored ink coating and the secondary coating.

16. The optical fiber ribbon according to claim 14, further comprising a first colored ink coating covering a first colored optical fiber selected from said plurality of colored optical fibers and a second colored ink coating covering the remaining colored optical fibers, wherein the second colored ink coating is a different color than the first colored ink coating.

17. A method of producing visibly distinguishable colored optical fiber ribbons, comprising the steps of:
- (a) using a plurality of optical fibers, each including a primary coating and a colored secondary coating;
- (b) applying a colored ink coating to said colored secondary coating; and
- (c) applying a clear ribbon matrix coating to said colored ink coating while the colored ink coating is not fully cured, producing a strong bond between the colored ink coating and the clear ribbon matrix coating.

* * * * *